March 10, 1970 Y. C. SUEL ET AL 3,500,013

METHOD OF MAKING CONNECTIONS TO A MICROCIRCUIT

Filed June 28, 1967 2 Sheets-Sheet 1

INVENTORS
YVES CHARLES SUEL
GEORGES M. ORTINO
BY
Frank R. [signature]
AGENT

INVENTORS
YVES CHARLES SUEL
GEORGES M. ORTINO
BY
AGENT

United States Patent Office 3,500,013
Patented Mar. 10, 1970

3,500,013

METHOD OF MAKING CONNECTIONS TO A MICROCIRCUIT

Yves Charles Suel, St. Michel-Evreux, and Georges Michel Ortino, Evreux, France, assignors, by mesne assignments, to U.S. Philips Corporation, New York, N.Y., a corporation of Delaware Filed June 28, 1967, Ser. No. 649,545
Claims priority, application France, July 7, 1966, 68,569
Int. Cl. B23k *1/04*
U.S. Cl. 219—85 9 Claims

ABSTRACT OF THE DISCLOSURE

A method for attaching an external connecting wire to a conductive strip mounted on an insulating carrier plate and using an intermediary clamp member. Three separate and consecutive current pulses of different magnitude and duration are applied to the clamp member to selectively fuse the external connecting wire to the clamp member, the clamp member to the conductive strip, and to remove excess portions of the forming strip of which the clamp member is an intregal part thereof.

It is known to manufacture so-called microcircuits by starting from a thin insulating plate, usually of glass, which serves as a carrier for the active and passive circuit elements. All these circuit elements, or at least part thereof, are formed by thin layers and connected together by a network of metallic conductors. The microcircuit usually carries a plurality of parallel strips which are at right angles to one edge of the carrier plate and terminates on this edge. The said strips serve to make the necessary connections between the microcircuit and other parts of an electric device.

The metallic conductors and the strips comprise very thin metal layers and this makes it difficult for the connecting wires necessary for connecting of the microcircuit to the other parts to be soldered to the strips so as to obtain connections which adhere firmly and are mechanically rigid.

It has previously been considered, instead of making a direct contact between connecting wire and strip, to make an indirect contact with the aid of a metallic clamp which embraces the edge of the carrier plate at the area of the strip. The flat limb of the clamp makes contact with the strip over a large surface area, the other limb being bent in the form of an S and urging against the lower side of the carrier plate. The connecting wire is fixed to the bridge connecting the two limbs by means of a butt-weld.

Such a contact device comprises a plurality of identical clamps which are connected by a common strip. The clamps are placed along the strip at distances which correspond to the distances between the strips of the microcircuit. Connecting wires are electrically soldered to the clamps to permit making connections to other parts of the electrical device. The whole of the contact device is slipped onto the carrier plate of the microcircuit, whereafter the clamps are separated from the strip and subsequently soldered to the strips. It is also possible first to solder the clamps in position and to separate them from the strip only thereafter. To facilitate this separating operation longitudinal slits are punched at suitably chosen areas in the sections forming the connections between the clamps and the strip, the length of the surface of attachment thus being reduced to the length of the two remaining bridges on each side of the slit.

The manufacture of this contact device requires a number of operations, such as punching and forming the clamps and at last the soldering of the connecting wires. Further, several operations are necessary for connecting the clamps to the strips, namely the soldering of the clamps to the strips and the separation of the clamps from the strip by breaking the bridges connecting these parts together.

An object of the invention is to simplify this method and to combine in one operational cycle the said three operations, that is to say the making of the soldered connections between the connecting wires and the clamps, between the clamps and the strips, and the separation of the clamps from the strip.

According to the invention the three operations are carried out with the use of a welding device which comprises one, two or more welding heads as a function of the method adopted and the magnitude of the series to be manufactured.

According to the invention use is made of a welding device having at least two electrodes at least one of which comprises two elongated parts between which a wire is clamped one end of which projects from the electrode and is brought into contact with the bridge of one of the clamps, whereafter a first current pulse of short duration and high strength is applied between the electrodes, resulting in the said wire being soldered to the bridge, then a second current pulse of longer duration and lower strength is applied which makes a soldered connection between the flat limb of the clamp and the corresponding strip by melting a thin layer of fusible material which has been previously provided between the flat limb and the strip, and at last a third current pulse of short duration and high strength is applied which is capable of melting the narrow parts connecting the clamp to the strip, whereupon the two elongated parts of the electrode are moved apart and the wire is cut to a desired length for forming a connecting wire.

To carry out all the operations in the prescribed cycle and in the correct manner it is necessary to fulfil a plurality of conditions. Thus, on applying the first current pulse, it must be certain that the resistance between the connecting wire and the bridge is higher than all the other resistances in the circuit and notably higher than the resistance of the bridges between the clamp and the strip. The resistance of the bridges must be lower than a specific limit value which causes the dimensions of the slits which are punched in the strip and determinative of the dimensions of the bridges to be regular. The current pulse heating the clamp and more particularly the flat limb must not be unduly strong to prevent the bridges from fusing prematurely. It is also for this reason that this pulse is chosen of a compartively long duration. The remaining contact resistances must be as low as possible and more particularly the resistance between the first electrode with the wire clamped in it and the resistance between the second electrode and the strip.

The clamps are made of a resilient metal so that they clamp firmly. The resistivity of the metal must be sufficiently high so that no undue currents are necessary for heating the clamps. A suitable metal is phosphor bronze. When a welding device having a plurality of welding heads is available there as several possibilities for carrying out the method. With two welding heads it is possible to process two clamps simultaneously. However, the adjustment is then more difficult and the number of clamps must be even. This latter condition is not necessary when using a welding device having two welding heads and a common return electrode.

In order that the invention may be readily carried into effect it will now be described in detail, by way of example, with reference to the accompanying diagrammatic drawings, in which.

Figures 1, 2:
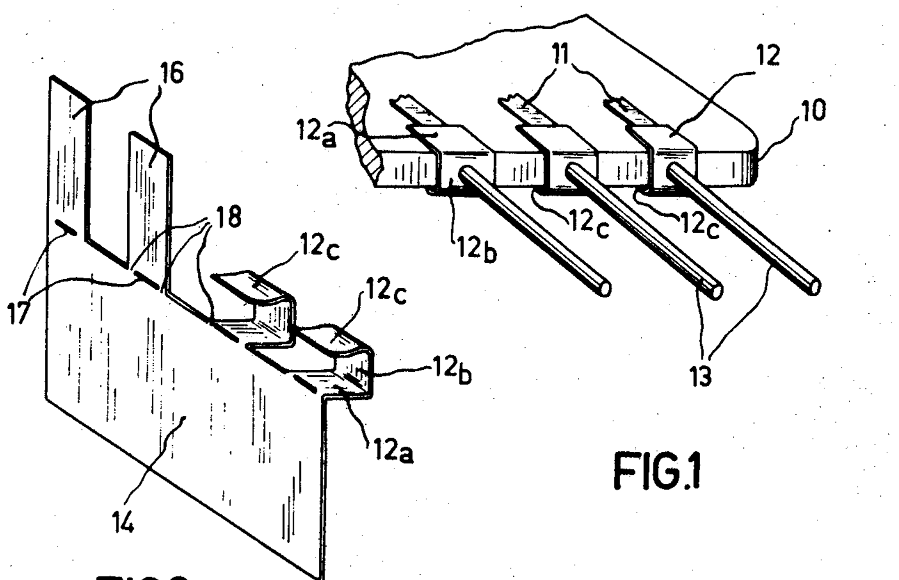
FIGURE 1 shows part of the carrier plate of a microcircuit with clamps provided with connections fitted on it.
FIGURE 2 shows a contact device comprising a strip having four clamps two of which have been shaped into their ultimate form.

A microcircuit (not shown) is provided on an insulating carrier plate 10 which is shown only in part in FIGURE 1. The microcircuit includes metallic output strips 11 which terminate on clamps 12 which embrace an edge of the carrier plate 10. Each clamp has a flat limb 12*a* which is electrically connected to a strip 11 using a thin tin-lead solder layer, and an S-shaped limb 12*c* which engages the lower side of the carrier plate 10. Connecting wires 13 are soldered to a bridge 12*b* between the limbs and serve to make connections to other parts of an electrical device. The clamps 12 form part of a strip 14 (FIGURE 2) and also remain in this condition as the strips 11 are soldered to the carrier plate.

The contact device is manufactured by punching tongues 16 in a plate which have the length required for the clamps. In the sections where the tongues form part of the strip there are formed slits 17 of a length which is a little less than the width of the tongues, so that the tongues are connected to the strips only by bridges 18 located on each side of the slit. The tongues 16 are formed into clamps 12 by bending resulting ultimately in a contact device comprising a plurality of clamps 12 which are integral with the strip 14, the limbs 12*a* being contiguous with the strip and at right angles thereto.

Figure 3:
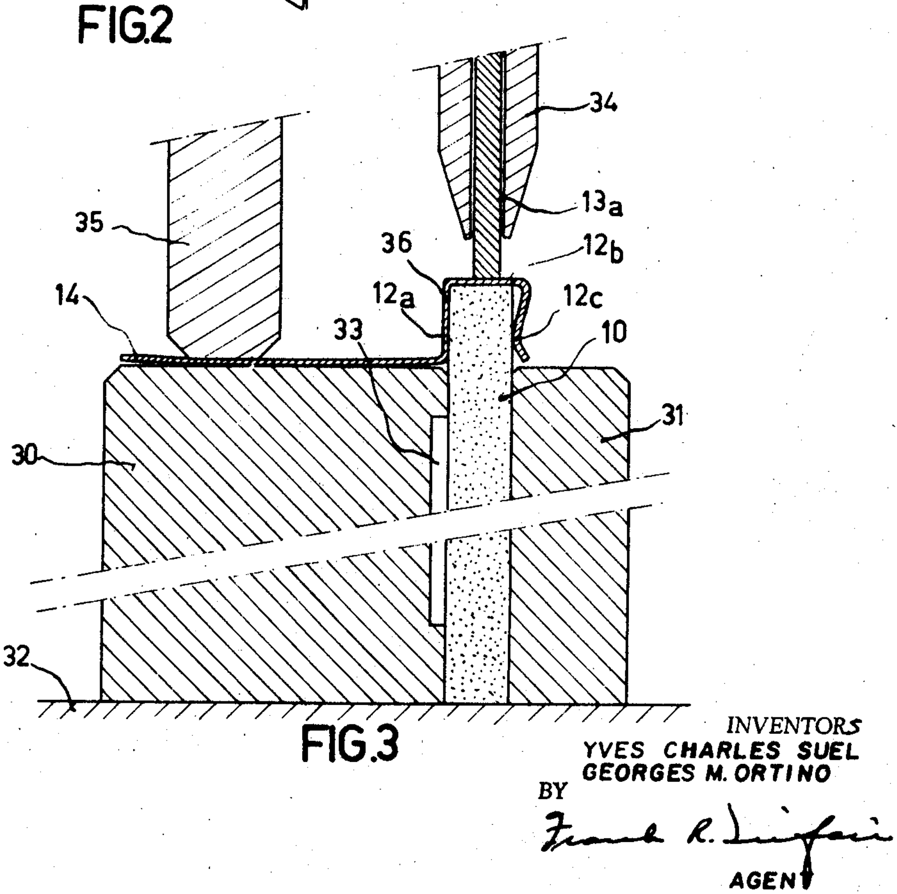
FIGURE 3 shows the arrangement of the welding electrodes and the supporting block during the welding process, a cross-section being shown which has been taken through the axis of the connecting wire.

When usin gthe method according to the invention the preparations for making the contact device are thus completed. In the method formarly used the connecting wires 13 still had to be soldered to the clamps before placing the contact device on the carrier plate. In the method according to the invention the ends of the strips are coated, for example by immersion, with a thin layer of tin-lead solder and a flux. Thereafter the contact device, after being cleaned, is placed on the edge of the carrier plate 10 with the use of a jig. The carrier plate 10 together with the contact device is now fixed in position in a supporting block of insulating material, for example ceramic material, and placed under the electrodes of the welding device. The supporting block comprises, for example, two parts 30 and 31 (FIGURE 3) between which the carrier plate is clamped and also rigidly held during the welding process.

In the embodiment described the upper side of the carrier plate 10, which carries the microcircuit, is adjacent the part 30 of the supporting block. The edge of the carrier plate with the contact device projects above the supporting block. The other opposing edge of the carrier plate bears on the base of the supporting block or directly on a table 32 of the welding device. The strip 14 of the contact device directly engages the upper side of the part 30 of the supporting block or at least at a small distance therefrom. The part 30 is provided with a cavity 33 so that the component parts of the microcircuit, such as diodes or transistors, cannot contact this part.

The welding device is equipped with one or more welding heads each having an electrode 34 comprising two longitudinally separated parts in which a groove or channel has been formed. The wire 13*a* for the connecting wires is guided through this channel. The lower free end of th wire projects slightly from the electrode 34 and makes contact with the clamp at the centre of the bridge

12*b*. The inner side of the bridge engages the narrow edge of the carrier plate 10.

A clamping device (not shown) in the stressed condition holds the two parts of the electrode 34 clamped on one another, thus holding the wire 13*a* in the channel. A good electric contact between the wire and the electrode is thus established. When the clamping device is released the two electrode parts slightly move apart so that the electrode can slide freely along the wire. A heavier solid electrode 35 urges against the strip 14 of the contact device.

The current path between the electrodes 34 and 35 extends, starting from the electrode 34, via the wire 13*a*, the bridge 12*b* of the clamp 12, the limb 12*a*, the bridges 18 and the strip 14. This path includes resistances which are formed by the just mentioned elements and the contacts present between them. The contact resistances electrode 34–wire, 13*a* and electrode 35–strip 14 must be made as low as posible. Further, it is important that the resistance of the two bridges 18 should be lower than the resistance between the wire 13*a* and the clamp 12. The parts of the clamp 12 and of the strip 14 which are included in the said current path have resistances which are much lower than those just mentioned.

Figure 4:
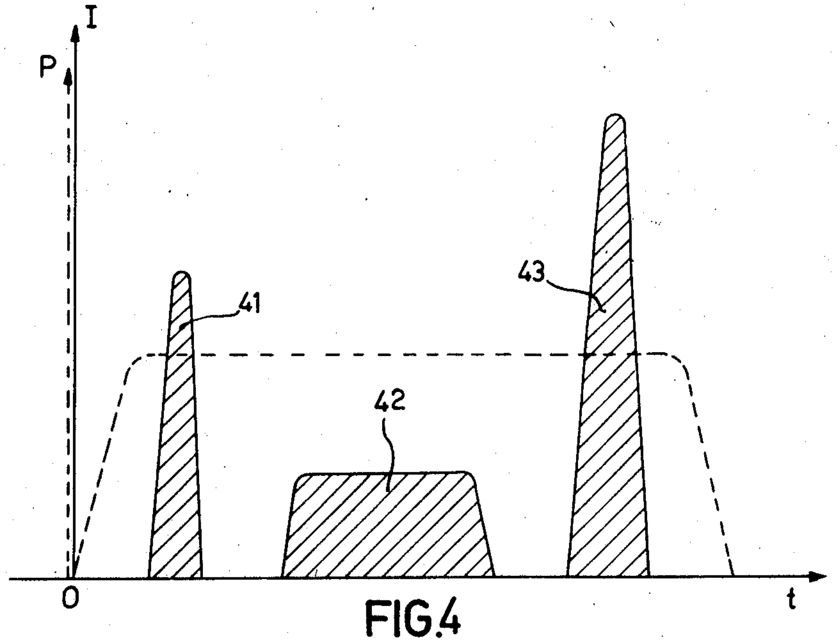
FIGURE 4 shows a graph of the cycle of current pulses used for welding the clamps and for separating the clamps from the strip.

The pressure which is thus exerted on the electrode 34 and hence, via the wire 13*a*, on the clamp 12 is indicated by a broken line in FIGURE 4. In the presence of this pressure a first current pulse of short duration and high strength is applied as shown by the pulse 41 in FIGURE 4, resulting in the wire 13*a* being soldered to the clamp 12. Subsequently a second pulse 42, which is comparatively longer and less strong, heats the clamp and more particularly the limb 12*a* so that the thin tin-lead solder layer located under the limb fuses and the strip and the clamp are connected together. Now the clamp 12 can be separated from the strip 14, which is done by breaking the bridges 18 by fusion using a strong current pulse 43. Subsequently the electrodes 34 and 35 are pulled up, that is to say the electrode 34 over a height such that a portion of the wire 13*a* of the desired lentgh is released. The relevant portion is cut off by means of two cutting blades not shown. Now the supporting block 30, 31 together with the carrier plate and the contact device is displaced for bringing a second clamp under the electrode 34. The clamping device closes the electrode 34 and this electrode is lowered on the second clamp, whereafter the cycle of operations is repeated.

With an even number of clamps it is possible to use a welding device having two welding heads. Each head then includes an electrode 34, and the electrode 35 may be dispensed with. The two electrodes 34 push simultaneously on two adjacent clamps and the current flows from one electrode to the other. Consequently two operational cycles are carried out simultaneously, that is to say twice as much as in the case first considered. However, the cycle itself has not changed.

Optimum results are obtained with a welding device having as many heads as there are clamps and including a common return electrode which is placed on the strip 14. The heads each including an electrode 34 may be pushed on the contact device either simultaneously or in succession. In the first-mentioned case a step switch provides for the current being switched from one head to the other. It is also possible to separate the clamps in common from the strip by means of the simultaneously occurring current pulses which flow from the individual heads to the common return electrode. With a given adjustment of the device it is possible, with the aid of the regularity in the occurrence of these pulses, to check the quality of the welds between the clamps and the connecting wires which have previously been made.

It will be evident that the embodiments described can be modified and the expedients employed can be replaced by equivalent means.

What is claimed is:

1. A method of connecting external wires to a microcircuit having an insulating carrier plate provided with current conductive strips which extend in parallel with one another and terminate at right angles to an edge of the plate, comprising the steps of attaching metal clamps to the plate each having a flat limb coated with a fusible material which engages one of the said conductive strips and is connected by a bridge to a limb which urges against the side of the plate remote from the strips, the end of the flat limb of each clamp being temporarily connected together by a connecting bridge; contacting an external connecting wire with the bridge of the clamp, applying a first current pulse of short duration and high strength through the wire and clamp resulting in the wire being soldered to the bridge, applying a second current pulse of longer duration and lower strength than the first pulse to form a soldered connection between the flat limb of the clamp and the corresponding conductive strip by melting the fusible material but not affecting the previously soldered wire, applying a third current pulse of shorter duration than the second pulse, but longer duration than the first pulse having a strength higher than either of the previous pulses, and capable of melting the connecting bridges but having no effect on the previously soldered connections.

2. A method as claimed in claim 1 wherein the external connecting wire is held in contact with the bridge by a bipartite electrode and the current pulses are applied through the wire and clamp to a common electrode.

3. A method as claimed in claim 2, where there are as many bipartite electrodes as there are clamps, and the electrodes are brought successively into contact with the clamps.

4. A method as claimed in claim 2, where there are as many bipartite electrodes as there are clamps, and the electrodes are brought simultaneously into contact with the clamps, the current pulses being passed successively through each electrode.

5. A method as claimed in claim 4, wherein the individual clamps are separated from each other by simultaneously passing current pulses through the bipartite electrodes to the common electrode.

6. A method of attaching external connecting wires to conductive strips mounted on an insulating carrier plate of an electrical component comprising the steps of forming clamp members from a conductive forming strip, coating a portion of the clamp members with a thin layer of fusible material: affixing the clamp members to the carrier plate so that the fusible materal contacts the conductive strips on the plate; placing the connecting wires in contact with the clamps; passing a first current pulse of fixed duration and magnitude through the wire and clamps to cause the wires to become fused to the clamps, said first current pulse having no effect on the fusible material, and then applying a second current pulse of longer duration and less magnitude than said first current pulse, to the wires to melt the fusible material and thereby fuse the clamps to the conductive strips, said second current pulse having no effect on the previously fused wires.

7. A method of attaching external connecting wires to conductive strips as claimed in claim 6 and further comprising the step of applying a third current pulse of longer duration than the first current pulse but shorter duration than the second current pulse and having a magnitude greater than that of the first current pulse to separate by melting the excess portions of the forming strip attached to the clamps by connecting bridges, said third current pulse having no effect on either of the previously formed connections.

8. A method of attaching external connecting wires to conductive strips as claimed in claim 7 wherein the forming strip and clamp members are phosphor bronze metal.

9. A method of attaching external connecting wires to conductive strips as claimed in claim 8 wherein the clamp is coated by immersion with a thin layer of tin lead solder and a flux.

References Cited

UNITED STATES PATENTS 3,126,619 3/1964 Brent ------------- 29—155.55

FOREIGN PATENTS 929,828 6/1963 Great Britain.

JOSEPH V. TRUHE, Primary Examiner

L. A. SCHUTZMAN, Assistant Examiner

U.S. Cl. X.R.

29—625, 626, 628, 630; 219—117